United States Patent

Crenshaw

[11] Patent Number: 5,294,016
[45] Date of Patent: Mar. 15, 1994

[54] WASTE CONTAINER COVER

[75] Inventor: Will B. Crenshaw, Beaumont, Tex.

[73] Assignee: The Modern Group, Inc., Beaumont, Tex.

[21] Appl. No.: 954,264

[22] Filed: Sep. 29, 1992

[51] Int. Cl.⁵ .......................... B65D 43/03; B60J 7/08
[52] U.S. Cl. ..................... 220/380; 220/200; 296/99.1; 296/213; 296/220
[58] Field of Search ............. 220/200, 254, 287, 380, 220/562; 296/99.1, 100, 101, 213, 220

[56] References Cited

U.S. PATENT DOCUMENTS

| 1,524,185 | 1/1925 | Lockwood | 220/287 |
| 3,342,523 | 9/1967 | Lutgen | 296/100 |
| 3,411,659 | 11/1968 | Seifert | 220/287 |
| 4,083,470 | 4/1978 | Stefanik et al. | 220/254 |
| 4,406,493 | 9/1983 | Albrecht et al. | 296/100 |
| 4,813,735 | 3/1989 | Avitable | 296/100 |
| 4,909,561 | 3/1990 | Lovaas | 296/100 |
| 4,932,549 | 6/1990 | Gouttefangeas | 220/254 |
| 5,036,775 | 8/1991 | Snead | 296/100 X |

*Primary Examiner*—Allan N. Shoap
*Assistant Examiner*—Vanessa Caretto
*Attorney, Agent, or Firm*—Pravel, Hewitt, Kimball & Krieger

[57] ABSTRACT

The invention is directed to an improved cover for a waste container composed of multiple formed cover sections, the cover sections interlock to fluid proof seal. The cover sections have a cross section which induces fluids to flow outwardly off of the cover sections, thereby preventing fluids from leaking into the material within the container. The cover sections are secured on the container by their own weight and are stackable, providing for compact storage when not in use.

11 Claims, 2 Drawing Sheets

WASTE CONTAINER COVER

BACKGROUND OF THE INVENTION

The present invention is directed to a waste container cover, more particularly, to an improved cover for containers used in the temporary storage and transport of high viscosity waste materials.

Field of the Invention

The storage, handling and disposal of industrial waste materials has come under increased scrutiny in the past few years. Failure to comply with various state and governmental regulations can subject a person or company to significant tort liability.

One type of waste material generated by petroleum refineries and chemical plants is a highly viscous sludge-like waste material composed of residual chemical by-products and other materials. Disposal of this waste material requires a chemical analysis of the material, a determination of a suitable means for disposing of the material, obtaining the necessary transportation and disposal permits and transporting the material to the disposal site. It will be appreciated that the time required for this process can be considerable. As a result, the waste material is stored at the manufacturer's site during the analysis and permit approval process.

Two common means of disposing of the waste material are dumping in an approved landfill or incineration. The cost of incineration of the waste material is generally greater than disposing of the material in a landfill. However, dumping of the waste material may violate environmental regulations. The selection of dumping versus incineration is dependent on the nature of the chemical by-products contained within the sludge, the cost of various disposal methods and state and federal environmental regulations. Thus, the waste material must be chemically analyzed to determine the types of chemicals contained within the waste material. Once the chemistry of the material has been established, it is essential that the chemistry be maintained prior to actual disposal or the selected disposal method may no longer be acceptable.

The refinery and chemical industries have generally adopted a rectangular, box-like, roll-on/roll-off container to store the waste material during the analysis and permit approval process. The containers are mounted on rollers, permitting the container to be moved to temporary storage areas. The containers are later hoisted onto a truck trailer or train car for transport to the disposal site. When filled, the sludge containers are moved to a holding area at the manufacturer's site while the waste product chemistry is analyzed and permits are obtained.

Current practice calls for the containers to be covered during chemical analysis and permit process by a flexible cover made from tarp, fabric, plastic or other material. However, flexible covers such as tarps or plastic have a number of disadvantages. They are bulky and are not readily installed and secured to the container. Further, water-proof flexible covers have a tendency to leak, permitting water to enter the waste material.

The introduction of water into the waste material after the laboratory analysis may alter the chemistry of the waste product, making the selected disposal method unsuitable. The introduction of water may also necessitate de-watering the waste material prior to dumping into a landfill or incineration, increasing the cost of disposal.

Thus, there exists a need for an improved roll-on/roll-off container cover capable of providing a water proof cover for the waste container during the storage, analysis and transport of the material to the disposal site.

SUMMARY OF THE PRESENT INVENTION

The present invention is directed to a lightweight, waterproof cover for a roll-on/roll-off container used to temporarily store and transport industrial waste materials. The container cover according to the present invention is comprised of interlocking, formed cover sections which fit over the containers to provide for a water proof seal.

One feature of the cover of the present invention is that the cover sections are stackable, providing for easy, compact storage when not in use. An additional feature of the cover according to the present invention is that the weight of the cover sections permits them to be placed on the roll-on/roll-off containers without any additional securing means.

BRIEF DESCRIPTION OF THE DRAWINGS

A better understanding of the present invention can be obtained when the following detailed description of exemplary embodiments is considered in conjunction with the following drawings, in which.

DETAILED DESCRIPTION OF THE PREFERRED EMBODIMENT

Figure 1:
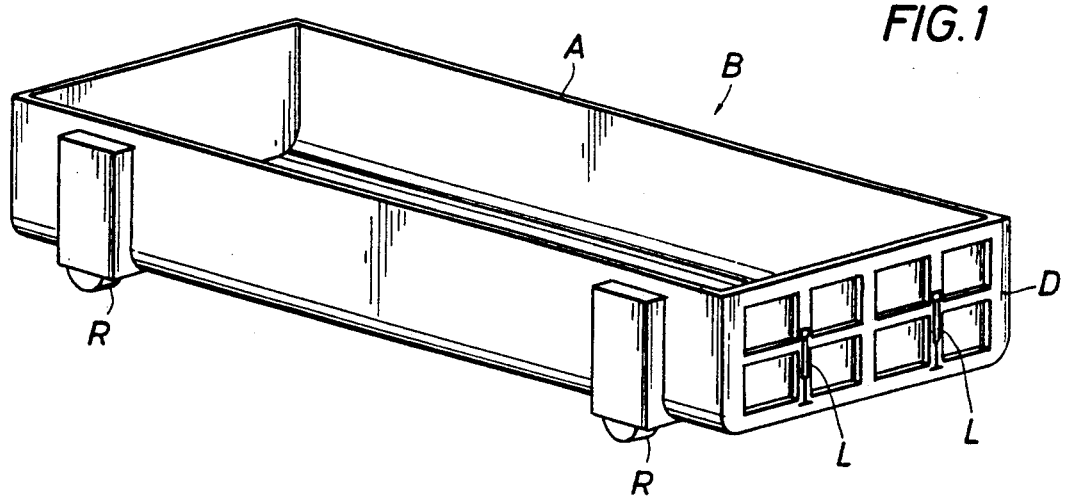
FIG. 1 is a perspective view of a typical roll-on/roll-off sludge container.

FIG. 1 is a perspective view of a typical roll-off/roll-on container utilized to temporarily store and transport waste materials. The container A includes a box section B, approximately 8 feet in width by 22 feet in length and is supported by four rollers R, two of which are illustrated in FIG. 1. The waste material is stored in the box B and is removed by releasing the latches L securing door D, which swings upward to permit the container A to be emptied or dumped. The typical roll-on/roll-off container A is capable of storing 20-30 cubic yards of sludge material.

Figure 2:
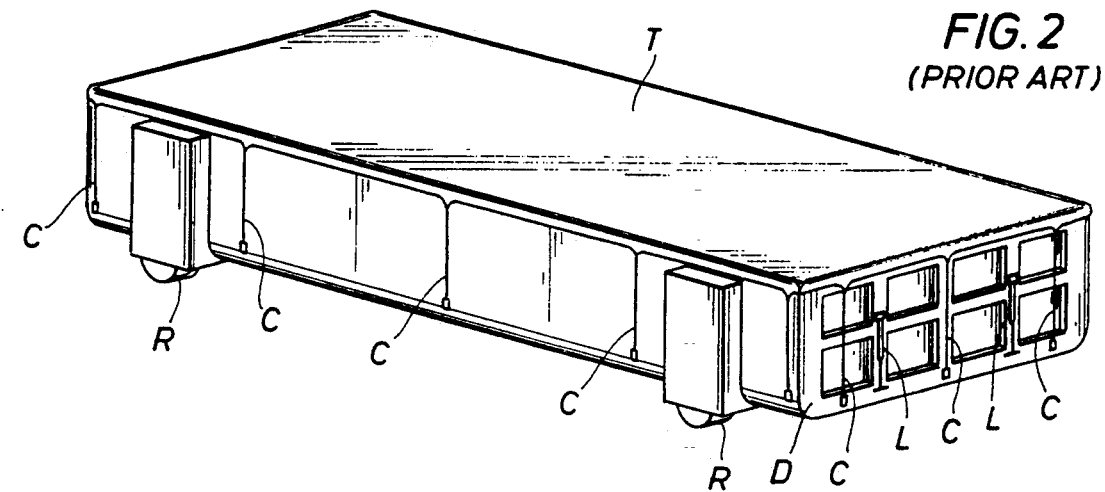
FIG. 2 is a perspective view of a container utilizing a typical prior art tarp cover.

FIG. 2 is a perspective view of a container A utilizing a typical prior art cover. The container A cover consists of a flexible tarp T or other flexible water resistant material stretched over the box B and secured by means of tie downs C, such as ropes, bungee cords or other suitable means. When rain falls on the tarp T, it tends to puddle in the center of the tarp T. While the tarp T may be initially water resistant, the continued presence of standing water on the tarp T results in water entering the waste material. As noted above, the introduction of water into the waste material following chemical analysis could alter the chemistry of the waste material, thereby invalidating the selected disposal method, and/or requiring expensive de-watering at the disposal site.

Figure 3:
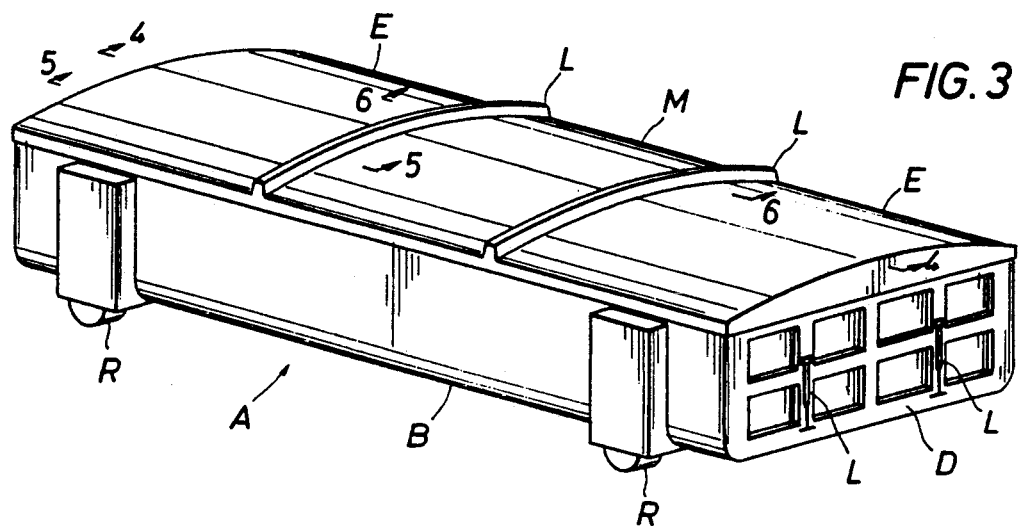
FIG. 3 is a perspective view of a container utilizing an embodiment of the cover according to the present invention.

FIG. 3 is a perspective view of a cover according to the present invention on a roll-on/roll-off container A. The cover of the preferred embodiment is comprised of three sections, two end sections E and a center section M. In the preferred embodiment, the cover sections E and M are arched in cross section and are composed of a formed, rigid, light weight fiberglass material. It will be appreciated that other rigid formable materials may be utilized in the construction of the cover sections. The arched cross section induces fluid to drain or flow outwardly to the edges of the cover sections and off of the cover. While the cover sections depicted in FIG. 3 have cross sectional arched configuration, it will be appreciated that other cross sectional configurations which induce water or other fluids to flow outwardly to the edge of the cover may be utilized to practice the present invention. The cover sections further include reinforcing fiberglass ribs on the underside of the cover sections (not shown) to improve the structural strength of the cover sections. The end cover sections E are interchangeable and fit over the end and sides of the box B. The center section M fits between the end cover sections E and includes two interlocking sections L which cooperate with the end cover sections E to secure the sections together and provide a water proof seal.

Figure 4:
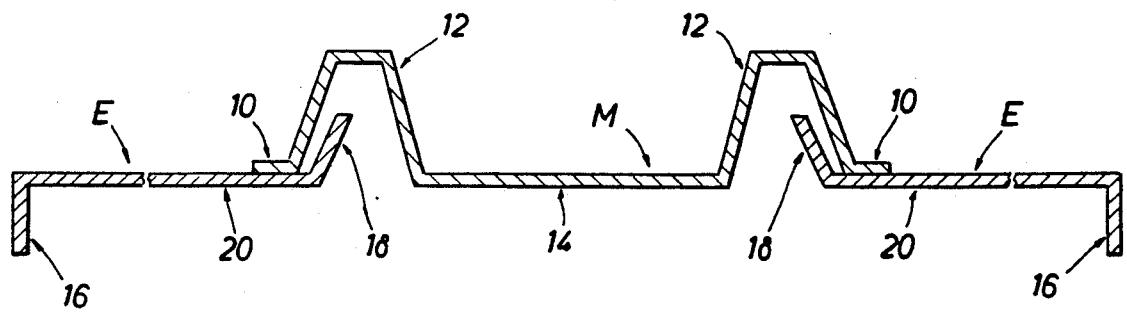
FIG. 4 is a lengthwise cross sectional view of an embodiment of the cover sections according to the present invention taken along line 4—4 of FIG. 3.

FIG. 4 is a lengthwise sectional view of the preferred embodiment of the present invention. It will be appreciated that, since FIG. 4 is a lengthwise sectional, the arched cross section configuration is not apparent. The cover of the preferred embodiment is comprised of two end sections E and a center section M. Each end section E includes a cover section 16 which fits over the end and sides (not shown) of the container, an arched covering portion 21 and a tab member 18 adjacent to center cover section M. It will be appreciated that end sections E may be interchangeably placed on either end of the container A. The center cover section M includes an arched covering portion 14, a cover section 10 and a hollow, raised locking member 12. The center cover section M locking member 12 and cover section 10 are located adjacent to end cover sections E. The center section M fits over the two end sections E, with the locking member 12 fitting over and retaining the tab sections 18. It will be appreciated that the lengthwise cross section configurations for cover sections E and M depicted in FIG. 4 are present across the width of the respective cover sections.

The locking member 12 thus secures and retains the tab member 18 of the adjacent end cover section E while providing a water proof cover. The cover sections E and M are constructed of a fiberglass material and the weight of the cover sections is sufficient to maintain the securing relationship between tab 18 and locking members 12.

The center section M cover sections 10 extend along the arched covering portions 20 of end sections E for a short distance to provide for an improved seal. Since covering sections 14 and 20, as well as tab members 18 and locking members 12 have a Cross sectional arch, fluids will drain outwardly to the side of the covering sections and off the container lid, as opposed to seeping in between the sections and into the waste material.

Installation of the cover of the preferred embodiment may be accomplished by two persons. The end sections E are placed on a roll-on/roll-off container and the center section M is placed over the end sections E such that the tab member 18 on each end section E fits within the locking members 12 of center section M. The cover according to the preferred embodiment does not require any additional securement to the container, as the weight of the cover sections is sufficient to keep the cover on the container. The cover according to the present invention may be further secured to the container A utilizing tie downs, ropes or bungee cords as illustrated in FIG. 2 during transport to the disposal site.

It will be appreciated that while the locking members 12 of the center section M are depicted as having a trapezoidal cross section, any suitable cross sectional configuration which permits the locking members 12 to fit over and retain the tab members 18 may be utilized to practice the present invention. Similarly, any suitable configuration for tab member 18 Which fits within the locking section 12 of center section M may be utilized to practice the present invention.

Figure 5:
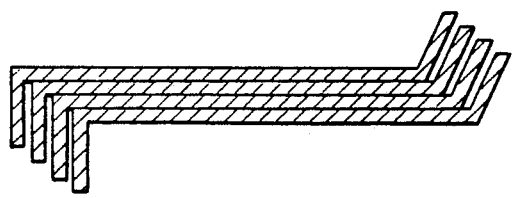
FIG. 5 is a partial lengthwise cross sectional view of several stacked cover sections according to the present invention. The cross section is taken along line 5—5 of FIG. 3.
Figure 6:
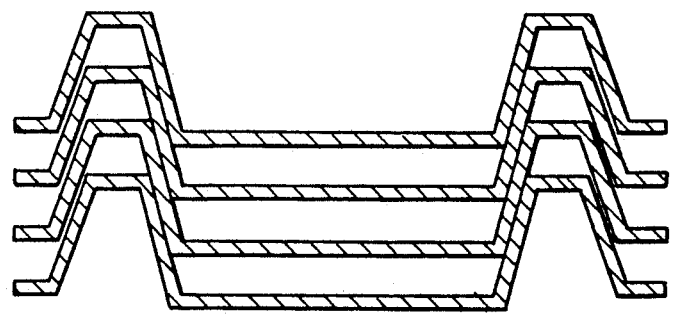
FIG. 6 is a partial lengthwise cross sectional view of several stacked cover sections according to the present invention. The cross section is taken along line 6—6 of FIG. 3.

An additional feature of the cover according to the present invention is that the end sections E may be readily stacked for storage purposes. The stacking feature of the end sections E of the preferred embodiment is illustrated in FIG. 5. The center sections M of the preferred embodiment may also be stacked for storage purposes as illustrated in FIG. 6.

Thus, the present invention provides for a lightweight water proof cover for the roll-on/roll-off waste material containers which may be readily installed on the containers. While the preferred embodiment depicts the use of three cover sections, the present invention is not limited to the number of cover sections illustrated in the preferred embodiment and contemplates the use of varying numbers of cover sections.

Having described the invention above, various modifications of the techniques, procedures, material and equipment will be apparent to those in the art. It is intended that all such variations within the scope and spirit of the appended claims be embraced thereby.

What is claimed is:

1. A cover for a waste container for preventing rain water from falling into the container, the cover comprising:
   (i) at least two end cover sections, each end cover section having four edges and comprising:
      a downwardly depending cover section on three of the four edges of the end cover section, the cover sections being for fitting over ends and sides of an end of the waste container;
      an upwardly projecting tab on a fourth edge of the end cover section for engaging with a locking member to connect an end cover section to a center cover section;
      a first covering portion disposed between the cover sections for covering an end portion of the waste container, the first covering portion shaped to induce rainwater impinging thereon to flow from the end cover section; and
   (ii) at least one center cover section comprising:
      raised locking members, with a cavity for receiving said tabs, at each of two edges of said center cover section, said locking members fitting over the engaging the upwardly projecting tabs of the end cover section in the cavity to provide a unitary cover; and a second covering section, shaped to induce rain to flow off the center cover section, disposed between the locking members for covering a central portion of the waste container.

2. The cover of claim 1, wherein the two end cover sections have lower and upper surfaces shaped so that an upper surface of one end cover section will nest against a lower surface of a second end cover section to permit nested stacking of multiples of end cover sections.

3. The cover of claim 1, wherein the center cover section has lower and upper surfaces shaped so that an upper surface of one center cover section will nest against a lower surface of a second center cover section to permit nested stacking of multiples of center cover sections.

4. The cover of claim 1 further comprising releasable retaining means for securing the cover to a waste container.

5. The cover of claim 1, wherein the end cover sections and the center cover sections are arched to induce rain to flow off the cover.

6. The cover of claim 1 further comprising reinforcing ribs on an underside of the end and center cover sections.

7. A unitary cover, made up of interconnecting sections, for a waste container to prevent falling rainwater from entering the container, the cover comprising:

(i) at least two end cover sections, each end cover sections comprising:

three edges with downwardly depending cover sections for fitting over ends and sides of a container;

a fourth edge for extending over the container, said fourth edge having an upward projecting tab for engaging with locking means to form a seal inpenetrable to falling rain water;

a first arched covering portion extending continuously between the four edges of each end cover section for shielding the waste container beneath the end cover sections from falling rain; and (ii) at least one center cover section comprising:

raised locking members, with a cavity for receiving said upwardly projecting tabs, at opposite edges of said center cover section, the locking means covering and engaging the upwardly projecting tabs of the end cover sections thereby forming a seal impenetrable to falling rain between the end covers and the center cover section; and a second arched covering portion extending between said opposite edges of the center cover, thereby providing, in combination with the end covers, a unitary cover to prevent falling rain from entering the waste container.

8. The cover of claim 7, wherein the end cover sections have lower and upper surfaces shaped so that an upper surface of one end cover section will nest against a lower surface of a second end cover section to permit nested stacking of multiples of end cover sections.

9. The cover of claim 7, wherein the center cover section has lower and upper surfaces shaped so that an upper surface of one center cover section will nest against a lower surface of a second center cover section to permit nested stacking of multiples of center cover sections.

10. The cover of claim 7 further comprising releasable retaining means for securing the cover to a waste container.

11. The cover of claim 7 further comprising reinforcing ribs on an underside of the end and center cover sections.

* * * * *

UNITED STATES PATENT AND TRADEMARK OFFICE
CERTIFICATE OF CORRECTION

PATENT NO. : 5,294,016
DATED : March 15, 1994
INVENTOR(S) : Will B Crenshaw

It is certified that error appears in the above-identified patent and that said Letters Patent is hereby corrected as shown below:

Column 3, line 42, change "Portion 21" to --Portion 20--.

IN THE CLAIMS

Claim 1, Column 5, line 1, change "the engaging" to --and engaging--.

Claim 7, Column 5, line 32, insert --of said-- after "each".

Claim 7, Column 5, line 38, change "upward" to --upwardly--.

Signed and Sealed this

Fifth Day of July, 1994

Attest:

BRUCE LEHMAN

Attesting Officer

Commissioner of Patents and Trademarks